(12) United States Patent
Gupta et al.

(10) Patent No.: US 10,853,391 B2
(45) Date of Patent: Dec. 1, 2020

(54) DEVICE IDENTIFICATION AND CONTROL IN A COMPUTING ENVIRONMENT

(71) Applicant: Dell Products L.P., Round Rock, TX (US)

(72) Inventors: Shreya Gupta, Austin, TX (US); Tyler Ryan Cox, Austin, TX (US); Spencer G. Bull, Austin, TX (US); Ryan Nicholas Comer, Austin, TX (US); Richard William Schuckle, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 141 days.

(21) Appl. No.: 16/136,764

(22) Filed: Sep. 20, 2018

(65) Prior Publication Data

US 2020/0097594 A1    Mar. 26, 2020

(51) Int. Cl.
*G06F 15/173* (2006.01)
*G06F 16/28* (2019.01)
*H04L 12/24* (2006.01)
*G06K 9/62* (2006.01)

(52) U.S. Cl.
CPC ......... *G06F 16/285* (2019.01); *G06K 9/6201* (2013.01); *H04L 41/0893* (2013.01)

(58) Field of Classification Search
CPC .. G06F 16/285; H04L 41/0893; G06K 9/6201
See application file for complete search history.

(56) References Cited

U.S. PATENT DOCUMENTS

| | | | |
|---|---|---|---|
| 2015/0178101 A1* | 6/2015 | Krishnaswamy ... | G06F 9/44505 713/100 |
| 2018/0032563 A1* | 2/2018 | Qin ..................... | G06F 16/2291 |
| 2019/0037011 A1* | 1/2019 | Kumar .................. | H04L 45/121 |
| 2019/0098028 A1* | 3/2019 | Ektare ................... | H04L 43/10 |
| 2020/0177461 A1* | 6/2020 | Zhu ...................... | H04L 41/0893 |

\* cited by examiner

*Primary Examiner* — Aftab N. Khan
*Assistant Examiner* — Anh Nguyen
(74) *Attorney, Agent, or Firm* — Baker Botts L.L.P.

(57) ABSTRACT

Methods, systems, and computer programs encoded on computer storage medium, for identifying a classification of a first device; comparing the classification of the first device with a device classification listing for zones of control; determining that the classification of the first device matches i) the device classification listing for a first zone of control and ii) the device classification listing for a second zone of control; identifying a classification of a second device; comparing the classification of the second device with i) the device classification listing for the first zone of control and ii) the device classification listing for the second zone of control; determining that both i) the classification of the first device and ii) the classification of the second device matches the device classification listing for only the first zone of control; identifying a gateway of the first zone of control as managing the first and second devices.

18 Claims, 6 Drawing Sheets

DEVICE IDENTIFICATION AND CONTROL IN A COMPUTING ENVIRONMENT

BACKGROUND

Field of the Disclosure

The disclosure relates generally to information handling systems, and, more particularly, to a system and method for device identification and control.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

Innovative aspects of the subject matter described in this specification may be embodied in methods that includes identifying, by a device classification system, a classification of a first device of a plurality of devices, each device of the plurality of devices included within a zone of control of a plurality of zones of control, wherein each zone of control of the plurality of zones of control includes a respective gateway that manages the devices included within that zone of control; obtaining, for each zone of a control, a device classification listing corresponding to the zone of control; comparing, by the device classification system, the classification of the first device with the device classification listing for each zone of control; based on comparing the classification of the first device with the device classification listing for each zone of control, determining, by the device classification system, that the classification of the first device matches i) the device classification listing for a first zone of control and ii) the device classification listing for a second zone of control; in response to determining that the classification of the first device matches i) the device classification listing for the first zone of control and ii) the device classification listing for the second zone of control, identifying a classification of a second device of the plurality of devices; comparing, by the device classification system, the classification of the second device with i) the device classification listing for the first zone of control and ii) the device classification listing for the second zone of control; based on comparing the classification of the second device with i) the device classification listing for the first zone of control and ii) the device classification listing for the second zone of control, determining, by the device classification system, that both i) the classification of the first device and ii) the classification of the second device matches the device classification listing for only the first zone of control; identifying the gateway of the first zone of control as managing the first and the second device; and in response to identifying the gateway of the first zone of control as managing the first and the second device, controlling, by the device classification system, one or more parameters of one or more other devices that are included by the first zone of control through the gateway of the first zone of control.

Other embodiments of these aspects include corresponding system, apparatus, and computer programs, configured to perform the actions of the methods, encoded on computer storage devices.

These and other embodiments may each optionally include one or more of the following features. For instance, in response to identifying the gateway of the first zone of control as managing the first and the second device, identifying respective classifications of the one or more other devices included by the first zone of control. Identifying a third device located within the first zone of control; comparing a classification of the third device with the device classification listing for the first zone of control; in response to comparing a classification of the third device with the device classification listing for the first zone of control, determining that the device classification listing for the first zone of control does not include the classification of the third device; and in response to determining that the device classification listing for the first zone of control does not include the classification of the third device, updating a database to indicate the third device as an anomaly for the first zone of control. In response to determining that the device classification listing for the first zone of control does not include the classification of the third device, polling each device included by the first zone of control; in response to polling each device included by the first zone of control, determining that the third device is not included in the first zone of control; and in response to determining that the third device is not included in the first zone of control, updating the database to indicate the third device as the anomaly for the first zone of control. Based on comparing the classification of the first device with the device classification listing, determining that the classification of the first device matches only the device classification listing of the first zone of control; in response to determining that the classification of the first device matches only the device classification listing of the first zone of control, identifying the gateway of the first zone of control as managing the first device; and in response to identifying the gateway of the first zone of control as managing the first device, controlling one or more parameters of one or more other devices that are included by the first zone of control through the gateway of the first zone of control.

In response to determining that the classification of the first device matches i) the device classification listing for the first zone of control and ii) the device classification listing for the second zone of control, polling each device included by the first zone of control and the second zone of control; and in response to polling each device included by the first zone of control and the second zone of control, determining that the first device is included in the first zone of control. Identifying the classification of the first device is in response to detecting a presence of the first device. Detecting the presence of the first device includes visually detecting the first device; determining a location of an operator; detecting a presence of the first device that is positioned proximate to the location of the operator; and in response to detecting the presence of the first device, identifying the classification of the first device.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

Figure 1:
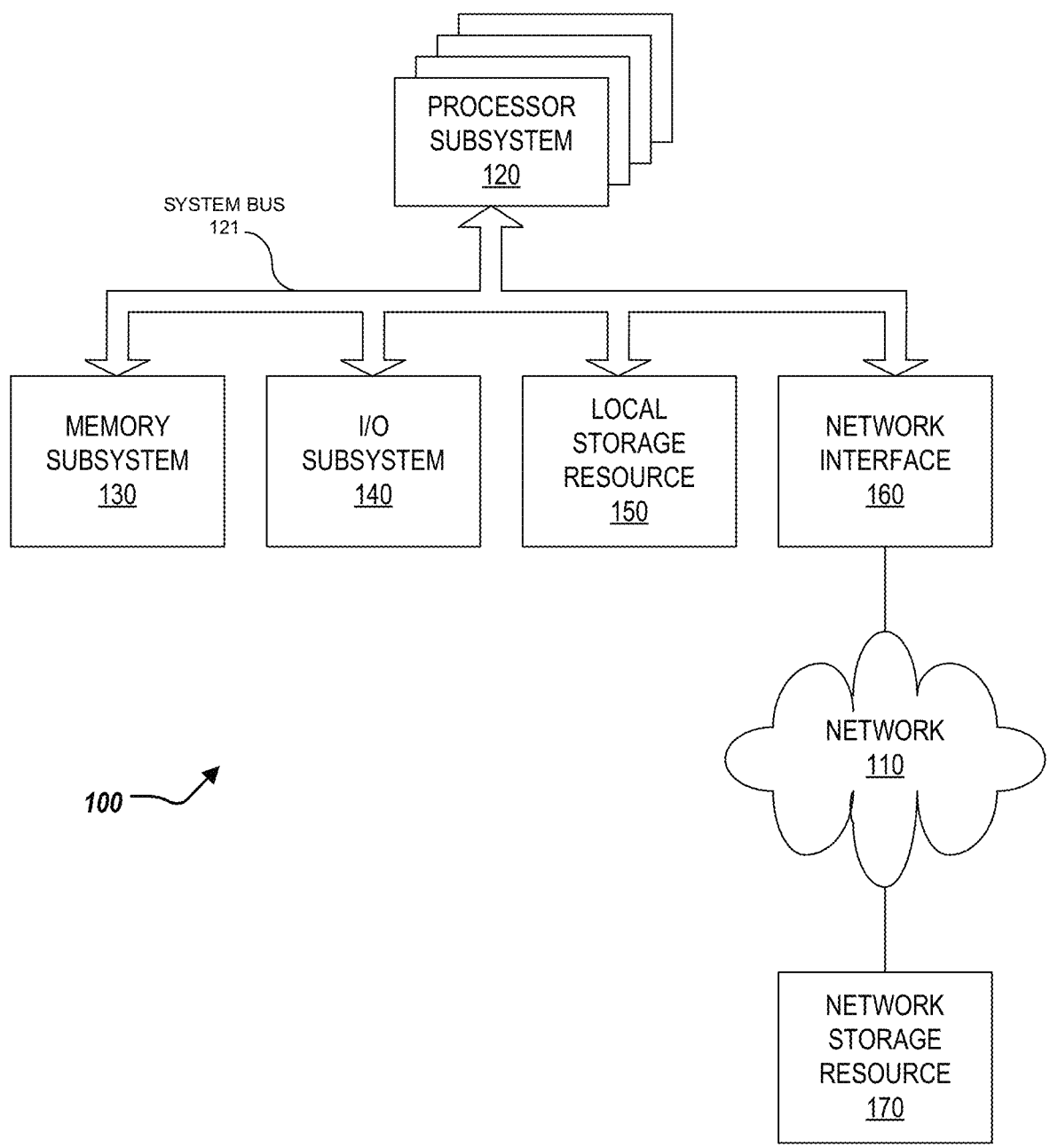
FIG. 1 is a block diagram of selected elements of an embodiment of an information handling system.

This document describes methods, systems, and computer readable medium for device identification and device control. Specifically, computing environments (e.g., internet-of-things (IOT) environments) are often deployed with various zones of control. A zone of control can include a gateway and devices that are managed by the gateway. An operator (e.g., user) may need a way to control these devices with another device that is capable of classifying the managed devices (e.g., a camera enabled mobile device). Upon entering the zone by the operator, the identification of a unique managed device in the zone identifies the zone of control in which the operator is located. However, it may be only possible to identify the classification of the device, and thus, the candidate zones can be limited to those that contain a device of that such classification. Subsequent device identification can further reduce the candidate zones to a unique match. Once the correct zone is identified, the zone context is available for future activities.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-6 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

Figure 2:
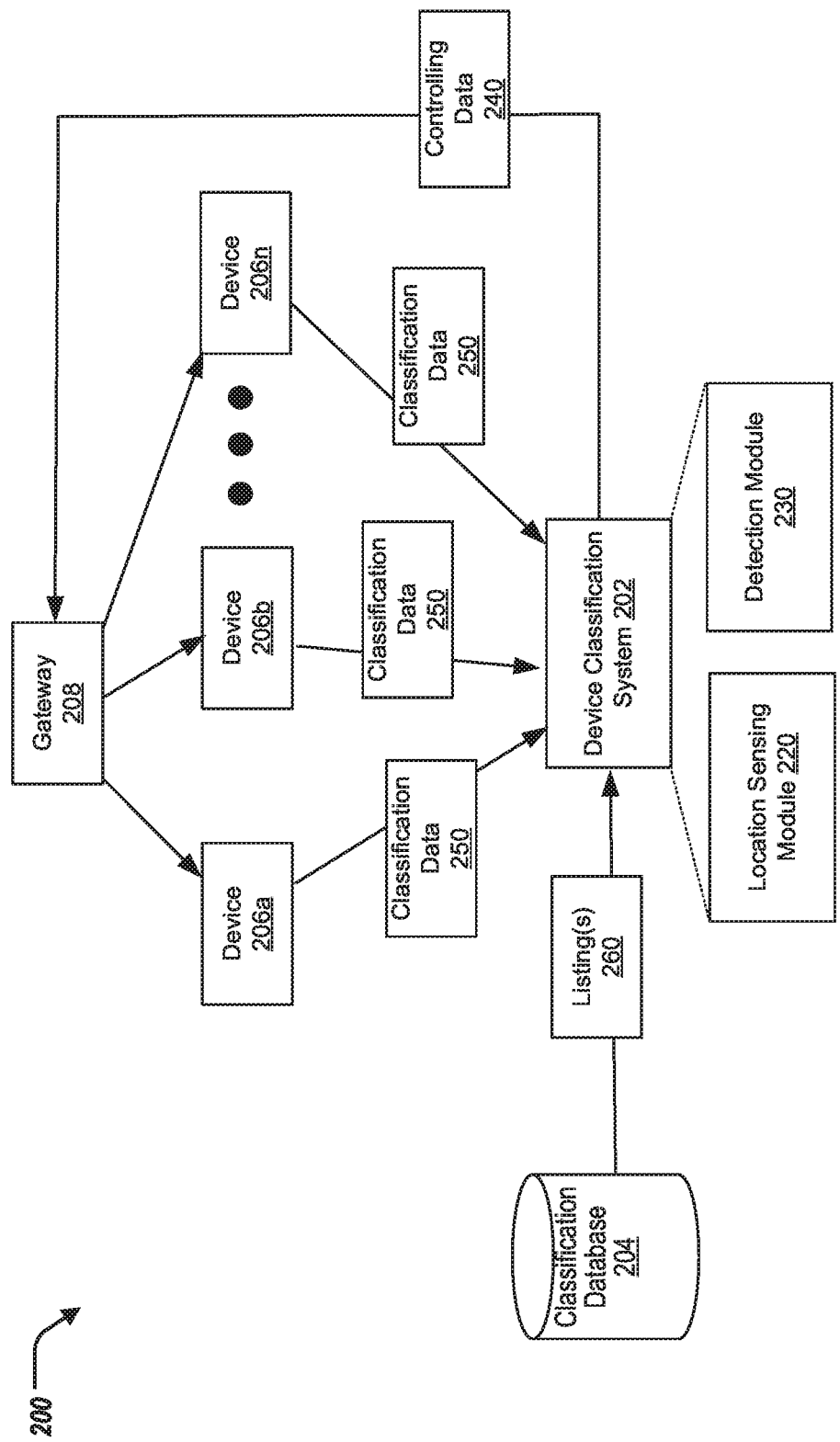
FIG. 2 illustrates an environment for detecting devices in zones of control.

Turning now to FIG. 2, FIG. 2 depicts an environment 200 for detecting devices in zones of control. The environment 200 includes a device classification system 202, a classification database 204, devices 206a, 206b, . . . , 206n (referred to as devices 206), and a gateway 208. The device classification system 202 can correspond to the information handling system 100 of FIG. 1. The environment 200 can include any number of devices 206. The device classification system 202 can be in communication with the classification database 204, the devices 206, and the gateway 208 over one or more networks (not shown). The gateway 208 can be in communication with the devices 206 over one or more networks (not shown). The device classification system 202 can receive classification data 250 from one or more of the devices 206.

The device classification system 202 can further include a location sensing module 220 for determining a location of the device classification system 202. The location sensed by the location sensing module 220 can be an absolute location of the device classification system 202, or relative to the devices 206 or zones of control of the devices 206. In some examples, the location sensing module 220 can implement simultaneous localization and mapping (SLAM).

The device classification system 202 can further include a detection module 230. The detection module 230 can detect a presence of the devices 206. In some examples, the detection module 230 can detect the devices 206 utilizing proximity detection—that is, the detection module 230 can detect the presence of the device 206 based on proximity of the detection module 230 to the respective devices 206. For example, the detection module 230 can include a camera-based system (e.g., an augmented reality system) that is able to visually detect the respective device 206.

Figure 3:
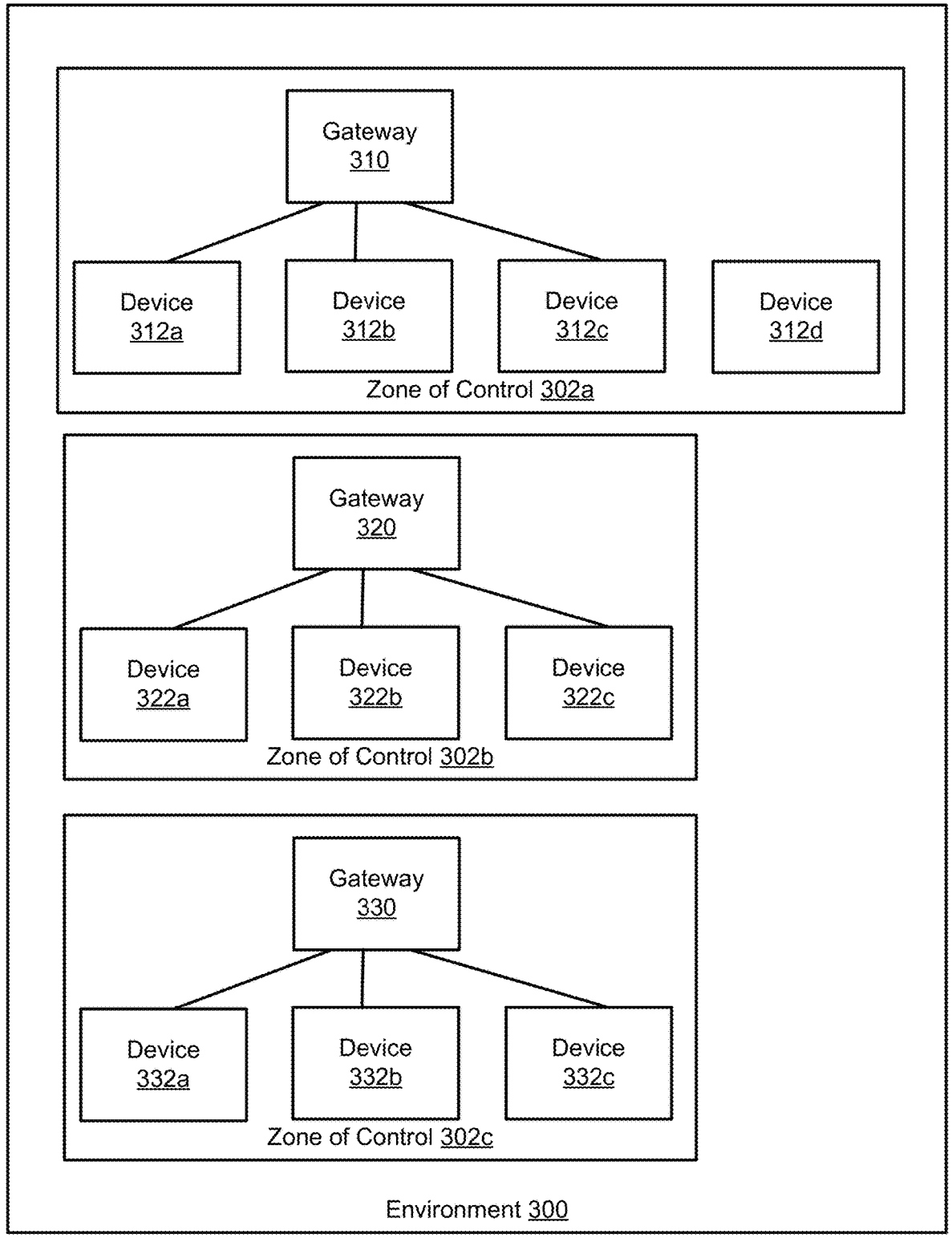
FIG. 3 illustrates an environment that includes zones of control.

The devices 206 can be included within respective zones of control. Specifically, each zone of control includes a respective gateway (e.g., the gateway 208) that manages the devices 206 included within that zone of control. In some examples, each zone of control is non-overlapping—e.g., each device 206 is included by only one zone of control. FIG. 3 illustrates an example environment 300 that includes zones of control 302a, 302b, 302c (referred to as zones of control 302). The zone of control 302a includes a gateway 310 and devices 312a, 312b, 312c (referred to as devices 312); the zone of control 302b includes a gateway 320 and devices 322a, 322b, 322c (referred to as devices 322); and the zone of control 302c includes a gateway 330 and devices 332a, 332b, 332c (referred to as devices 332). The gateways 310, 320, 330 can be similar to the gateway 208 of FIG. 1, and the devices 312, 322, 332 can be similar to any of the devices 206 of FIG. 1.

Figure 4:
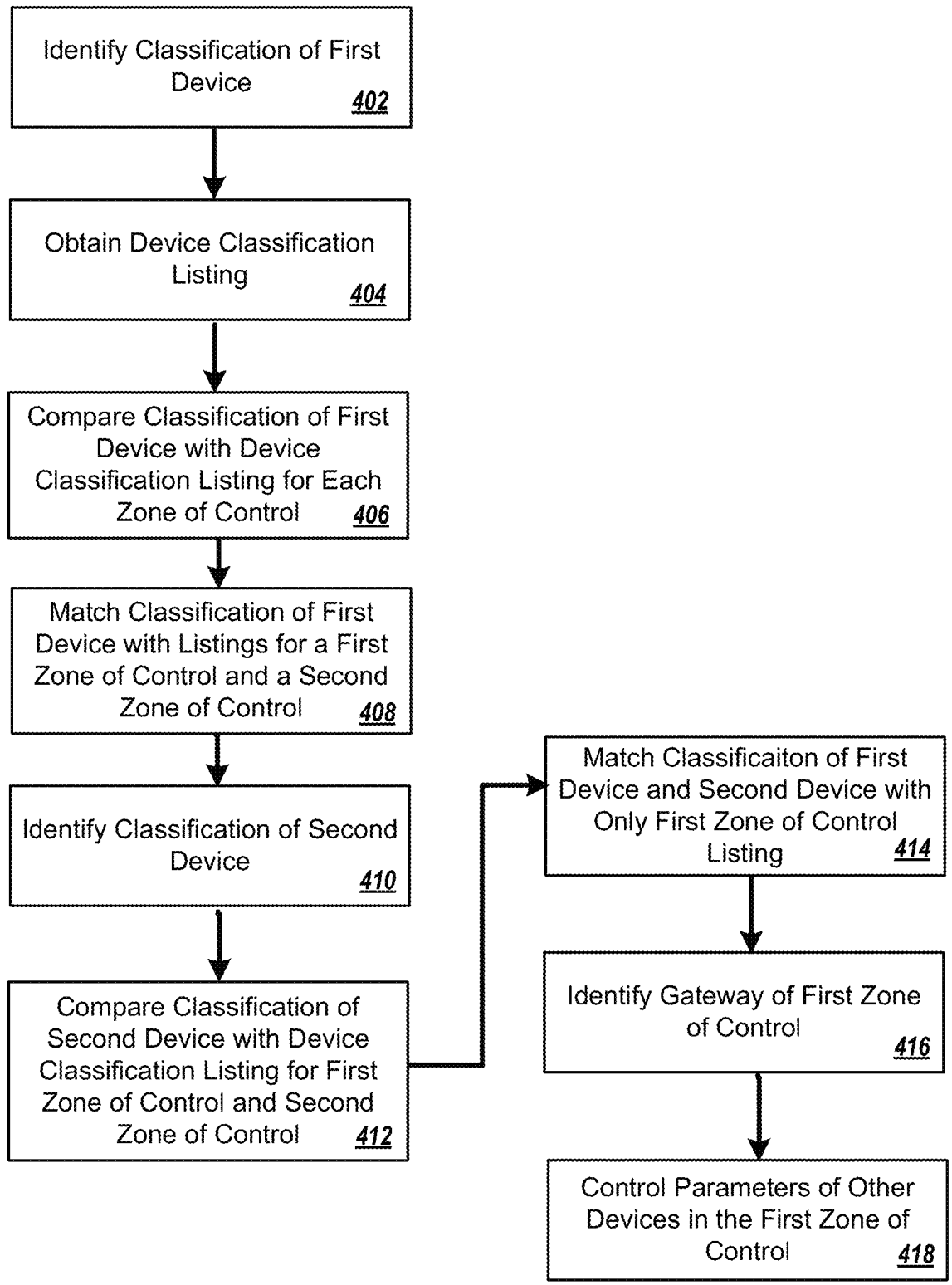
FIGS. 4, 5, 6 illustrate respective flowcharts for identification of devices.

The device classification system 202 can identify devices in a computing environment. FIG. 4 illustrates a flowchart depicting selected elements of an embodiment of a method 400 for identification of devices. The method 400 may be performed by the information handling system 100 and/or the device classification system 202 described herein with reference to FIGS. 1 and 2, or another information handling system. It is noted that certain operations described in method 400 may be optional or may be rearranged in different embodiments.

To that end, the device classification system 202 identifies a classification of the device 312a (402). For example, the device classification system 202 can identify the classification of the device 312a as classification A. In some examples, the device classification system 202 receives classification data (e.g., classification data 250) from the device 312a. In some examples, the device classification system 202 identifies the classification of the device 312a in response to detecting a presence of the first device 312a. For example, the detection module 230 can detect the presence of the device 312a by visually detecting the device 312a. In some examples, the location sensing module 220 can detect a location of an operator. For example, the operator—or user—is associated with the device classification system 202. The detection module 230 can detect the presence of the device 312a as the device 312a can be positioned proximate to the location of the operator. The device classification system 202, in response to the detection module 230 detecting the presence of the device 312a, identifies the classification of the device 312a.

The device classification system 202 obtains, for each zone of control 302, a device classification listing 260 that corresponds to each zone of control 302 (404). The device classification listings 260, for each zone of control, include a listing of classes of devices that are included by that zone of control 302. The device classification listings 260 can be stored by the classification database 204 and obtained by the device classification system 202 in response to a request for such.

In some examples, prior to identification of the device 312a, the device classification listings 260 can be generated and stored in the classification database 204. The devices 312, 322, 332 can be registered by a registration process with the classification database 204. However, in some examples, the device classification listings 260 only include which classification of devices 312, 322, 332 are controlled by which gateway 310, 320, 330. That is, the device classification listings 260 are independent of (e.g., do not include) device location information where the devices 312, 322, 332 and/or the gateways 310, 320, 330 are located.

The device classification system 202 compares the classification of the device 312a with the device classification listings 260 for each zone of control 302 (406). Specifically, the device classification system 202 can compare the classification of the device 312a—classification A—with the classifications that are listed for each device classification listing for each zone of control 302. For example, the listings 260 can include more than five, or tens of classification of devices for each particular zone of control 302.

The device classification system 202 determines, based on comparing the classification of the device 312a with the device classification listing 260 for each zone of control 302, that the classification of the device 312a matches i) the device classification listing 260 for the zone of control 302a and ii) the device classification listing 260 for the zone of control 302b (408). Specifically, each of the respective device classification listings 260 for the zones of control 302a, 302b include classification listings that match the classification of the device 312a. In other words, the device classification system 202 can determine that more than one gateway has the classification of the device 312a under control. Continuing the example, each of the gateways 310 and 320 can have devices that include the classification A within the respective zones of control 302a, 302b.

The device classification system 202 identifies, in response to determining that the classification of the device 312a matches i) the device classification listing 260 for the zone of control 302a and ii) the device classification listing 260 for the zone of control 302b, a classification of the device 312b (410). For example, the device classification system 202 can identify the classification of the device 312b as classification B. In other words, when the device classification system 202 can determine that more than one gateway has the classification of the device 312a under control, the device classification system 202 attempts to classify additional devices to narrow down the possible zones of control 302. In some examples, the device classification system 202 receives classification data (e.g., the classification data 250) from the device 312b.

The device classification system 202 compares the classification of the device 312b with the device classification listing 260 for the zone of control 302a and the device classification listing 260 for the zone of control 302b (412). Specifically, the device classification system 202 can compare the classification of the device 312b—classification A—with the classifications that are listed for the device classification listings 260 for the zones of control 302a, 302b.

The device classification system 202 determines, based on comparing the classification of the device 312b with the device classification listing 260 for the zone of control 302a and the device classification listing 260 for the zone of control 302b, that both i) the classification of the device 312a and ii) the classification of the device 312b match the device classification listing 260 for only the zone of control 302a (414). Specifically, only the device classification listings 260 for the zones of control 302a includes classification listings that matches the classification of the device 312a and the classification of the device 312b. In other words, the device classification system 202 can determine that only the gateway 310 has the classification of the device 312a and device 312b under control.

The device classification system 202 identifies the gateway 310 of the zone of control 302a as managing the devices 312a and 312b (416). In some examples, the device classification system 202, in response to identifying the gateway 310 as managing the devices 312a, 312b, identifies classification of other devices included by the zone of control 302a. For example, the device classification system 202 can identify the device 312c as being included by the zone of control 302a. In some examples, the device classification system 202 can, in addition to identifying the gateway 210 as managing the devices 312a, 312b, create a context (e.g., data table) that includes data indicating i) the gateway 310 and ii) a listing of devices 312a, 312b (and other devices controlled by the gateway 310—e.g., the device 312c) and appropriate metadata of such devices (e.g., device type).

The device classification system 202 controls, in response to identifying the gateway 310 of the zone of control 302a as managing the devices 312a and 312b, parameters of other devices that are included by the zone of control 302a through the gateway 310 of the zone of control 302a (418). The device classification system 202 can provide controlling data (e.g., controlling data 240) to the gateway 310. For example, the device classification system 202 can provide control data to the gateway 310 to control the device 312c. Such control data can include data that affects the output of the device 312c—for example, if the device 312c were to include a motor, such things as the RPM of the motor could be controlled.

In some examples, the device classification system 202 can perform anomaly detection. Specifically, when an unknown device is detected and polling of the device fails, the device classification system 202 can flag the device as an anomaly for further investigation. To that end, the device classification system 202 can identify a device 312d located within zone of control 302a. For example, the detection module 230 can detect the presence of the device 312d with the zone of control 302. The device classification system 202 compares the classification of the device 312d with the device classification listing 260 for the zone of control 302a. Specifically, the device classification system 202 can compare the classification of the device 312d—classification Z—with the classifications that are listed for the device classification listing 260 for the zone of control 302a. The device classification system 202 determines, in response to comparing the classification of the device 312d with the device classification listing 260 for the zone of control 302a, that the device classification 260 for the zone of control 302a does not include the classification of the device 312d—that is, classification Z. The device classification system 202, in response to determining that the device classification 260 for the zone of control 302a does not include the classification of the device 312d, updates a database to indicate that the device 312d as an anomaly for the zone of control 302a.

In some examples, the device classification system 202, in response to determining that the device classification 260 for the zone of control 302a does not include the classification of the device 312d, polls each device included by the zone of control 302a. For example, the device classification system 202 can poll each of devices 312a, 312b, 312c, 312d. The device classification system 202, determines, in response to polling devices 312a, 312b, 312c, 312d, that the device 312d is not included by the zone of control 302a. The device classification system 202, in response to determining that the device classification 260 for the zone of control 302a does not include the device 312d, updates a database to indicate that the device 312d as an anomaly for the zone of control 302a.

Figure 5:
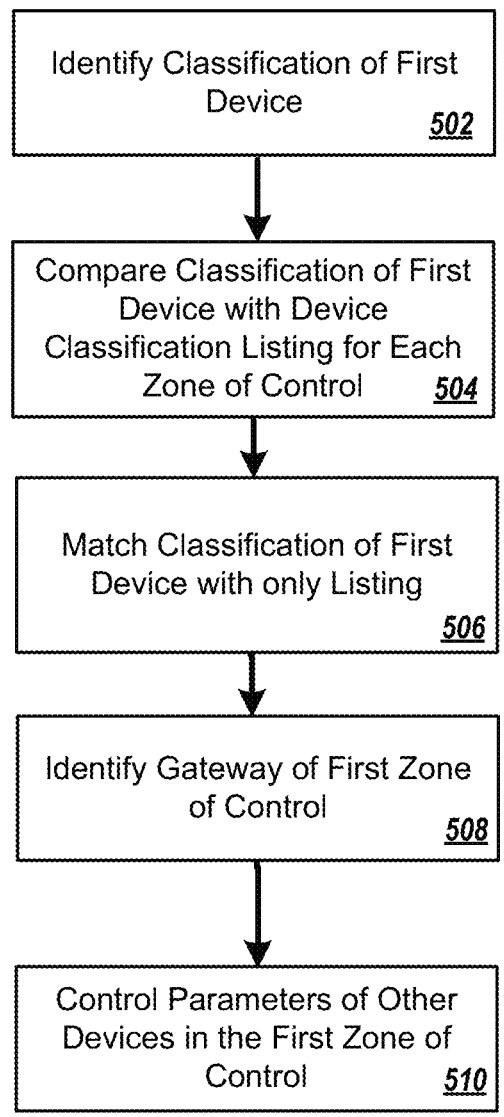

FIG. 5 illustrates a flowchart depicting selected elements of an embodiment of a method 500 for identification of devices. The method 500 may be performed by the information handling system 100 and/or the device classification system 202 described herein with reference to FIGS. 1 and 2, or another information handling system. It is noted that certain operations described in method 500 may be optional or may be rearranged in different embodiments.

The device classification system 202 identifies a classification of the device 322a (502). For example, the device classification system 202 can identify the classification of the device 322a as classification C. In some examples, the device classification system 202 receives classification data (e.g., classification data 250) from the device 322a. The device classification system 202 compares the classification of the device 322a with the device classification listings 260 for each zone of control 302 (504). Specifically, the device classification system 202 can compare the classification of the device 322a—classification C—with the classifications that are listed for each device classification listing for each zone of control 302. The device classification system 202 determines, based on comparing the classification of the device 322a with the device classification listing 260 for each zone of control 302, that the classification of the device 322a matches only the device classification listing 260 for the zone of control 302b (506). Specifically, only the respective device classification listings 260 for the zone of control 302b includes a classification listing that matches the classification of the device 322a. The device classification system 202, in response to determining that the classification of the device 322a matches only the device classification listing 260 for the zone of control 302b, identifies the gateway 320 of the zone of control 302b as managing the device 312b (508). The device classification system 202 controls, in response to identifying the gateway 320 of the zone of control 302b as managing the device 322a, parameters of other devices that are included by the zone of control 302 through the gateway 310 of the zone of control 302b (510).

Figure 6:
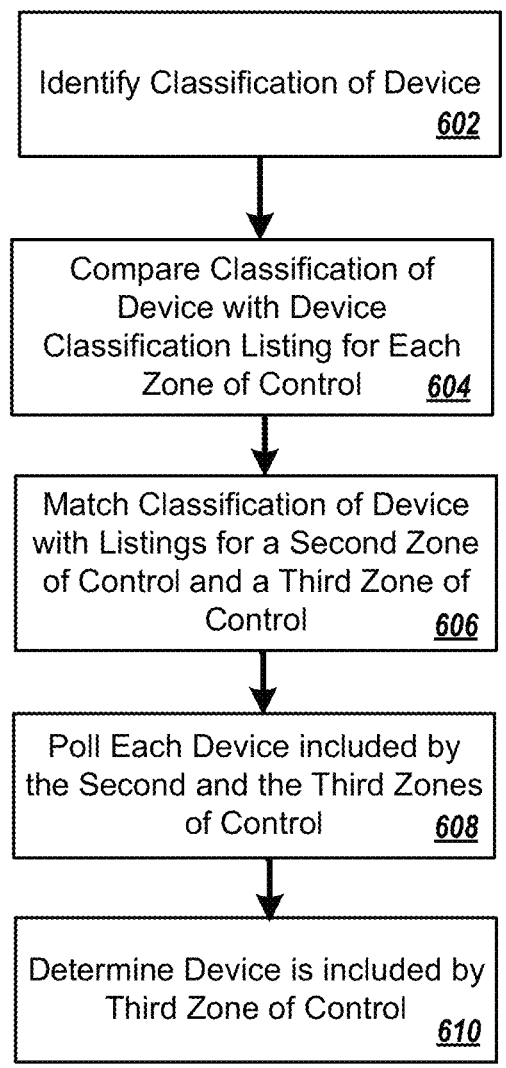

FIG. 6 illustrates a flowchart depicting selected elements of an embodiment of a method 600 for identification of devices. The method 600 may be performed by the information handling system 100 and/or the device classification system 202 described herein with reference to FIGS. 1 and 2, or another information handling system. It is noted that certain operations described in method 600 may be optional or may be rearranged in different embodiments.

To that end, the device classification system 202 identifies a classification of the device 332a (602). For example, the device classification system 202 can identify the classification of the device 332a as classification D. In some examples, the device classification system 202 receives classification data (e.g., classification data 250) from the device 332a. The device classification system 202 compares the classification of the device 332a with the device classification listings 260 for each zone of control 302 (604). Specifically, the device classification system 202 can compare the classification of the device 332a—classification D—with the classifications that are listed for each device classification listing for each zone of control 302. The device classification system 202 determines, based on comparing the classification of the device 332a with the device classification listing 260 for each zone of control 302, that the classification of the device 332a matches i) the device classification listing 260 for the zone of control 302b and ii) the device classification listing 260 for the zone of control 302c (606). Specifically, each of the respective device classification listings 260 for the zones of control 302b, 302c include classification listings that match the classification of the device 332a. The device classification system 202 polls, in response to determining that the classification of the device 332a matches i) the device classification listing 260 for the zone of control 302b and ii) the device classification listing 260 for the zone of control 302c, each device included by the zone of control 302b and 302c (608). For example, the device 332a can include a light fixture, and polling of the device 332a can determine a state of device 332a (e.g., on/off). The device classification system 202, determines, in response to polling each device included by the zone of control 302b and 302c, that the device 332a is included by the zone of control 302c (610). For example, the device classification system 202 can determine that the device 332a responds to controls through the gateway 330, and thus, the device 332a is included by the zone of control 302c.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computer-implemented method, comprising:
   identifying, by a device classification system, a classification of a first device of a plurality of devices, each device of the plurality of devices included within a zone of control of a plurality of zones of control, wherein each zone of control of the plurality of zones of control includes a respective gateway that manages the devices included within that zone of control;
   obtaining, for each zone of a control, a device classification listing corresponding to the zone of control, the device classification listing including multiple classifications of devices the zones of control, the device classification listing only including the devices are controlled by which gateway and is independent of a location of each of the plurality of devices and the gateways for each zone of control;
   comparing, by the device classification system, the classification of the first device with the device classification listing for each zone of control;
   based on comparing the classification of the first device with the device classification listing for each zone of control, determining, by the device classification system, that the classification of the first device matches i) the device classification listing for a first zone of control and ii) the device classification listing for a second zone of control;
   in response to determining that the classification of the first device matches i) the device classification listing for the first zone of control and ii) the device classification listing for the second zone of control, identifying a classification of a second device of the plurality of devices;
   comparing, by the device classification system, the classification of the second device with i) the device classification listing for the first zone of control and ii) the device classification listing for the second zone of control;
   based on comparing the classification of the second device with i) the device classification listing for the first zone of control and ii) the device classification listing for the second zone of control, determining, by the device classification system, that both i) the classification of the first device and ii) the classification of the second device matches i) the device classification listing for the first zone of control and ii) the device classification listing for the second zone of control;
   in response to determining that both the classification of the first device and the classification of the second device matches i) the device classification listing for the first zone of control and ii) the device classification listing for the second zone of control, polling each device included by the first zone of control and the second zone of control, including:
      providing, by a first gateway managing the devices included within the first zone of control, a command to each device included by the first zone of control, and
      providing, by a second gateway managing the devices included within the second zone of control, a command to each device included by the second zone of control;
   in response to polling each device included by the first zone of control and the second zone of control, determining that the first and the second device only respond to the command provided by the first gateway;
   in response to determining that the first and the second device only responds to the command provided by the first gateway, identifying the first gateway of the first zone of control as managing the first and the second device; and
   in response to identifying the gateway of the first zone of control as managing the first and the second device, controlling, by the device classification system, one or more parameters of one or more other devices that are included by the first zone of control through the gateway of the first zone of control.

2. The computer-implemented method of claim 1, further comprising:
   in response to identifying the first gateway of the first zone of control as managing the first and the second device, identifying respective classifications of the one or more other devices included by the first zone of control.

3. The computer-implemented method of claim 1, further comprising:

identifying a third device located within the first zone of control;

comparing a classification of the third device with the device classification listing for the first zone of control;

in response to comparing a classification of the third device with the device classification listing for the first zone of control, determining that the device classification listing for the first zone of control does not include the classification of the third device; and in response to determining that the device classification listing for the first zone of control does not include the classification of the third device, updating a database to indicate the third device as an anomaly for the first zone of control.

4. The computer-implemented method of claim 3, further comprising:

in response to determining that the device classification listing for the first zone of control does not include the classification of the third device, polling each device included by the first zone of control;

in response to polling each device included by the first zone of control, determining that the third device is not included in the first zone of control; and in response to determining that the third device is not included in the first zone of control, updating the database to indicate the third device as the anomaly for the first zone of control.

5. The computer-implemented method of claim 1, further comprising:

based on comparing the classification of the first device with the device classification listing, determining that the classification of the first device matches only the device classification listing of the first zone of control;

in response to determining that the classification of the first device matches only the device classification listing of the first zone of control, identifying the gateway of the first zone of control as managing the first device; and in response to identifying the gateway of the first zone of control as managing the first device, controlling one or more parameters of one or more other devices that are included by the first zone of control through the gateway of the first zone of control.

6. The computer-implemented method of claim 1, wherein identifying the classification of the first device is in response to detecting a presence of the first device.

7. The computer-implemented method of claim 6, wherein detecting the presence of the first device includes visually detecting the first device.

8. The computer-implemented method of claim 1, further comprising:

determining a location of an operator;

detecting a presence of the first device that is positioned proximate to the location of the operator; and in response to detecting the presence of the first device, identifying the classification of the first device.

9. A system comprising a memory media storing instructions and a processor having access to the memory media to execute the instructions to perform operations comprising:

identifying a classification of a first device of a plurality of devices, each device of the plurality of devices included within a zone of control of a plurality of zones of control, wherein each zone of control of the plurality of zones of control includes a respective gateway that manages the devices included within that zone of control;

obtaining, for each zone of a control, a device classification listing corresponding to the zone of control, the device classification listing, for each zone of control, including a listing of classes of devices included by that zone of control, the device classification listing including multiple classifications of devices corresponding to the zones of control, the device classification listing only including which classification of the devices are controlled by which gateway and is independent of a location of each of the plurality of devices and the gateways for each zone of control;

comparing the classification of the first device with the device classification listing for each zone of control;

based on comparing the classification of the first device with the device classification listing for each zone of control, determining that the classification of the first device matches i) the device classification listing for a first zone of control and ii) the device classification listing for a second zone of control;

in response to determining that the classification of the first device matches i) the device classification listing for the first zone of control and ii) the device classification listing for the second zone of control, identifying a classification of a second device of the plurality of devices;

comparing the classification of the second device with i) the device classification listing for the first zone of control and ii) the device classification listing for the second zone of control;

based on comparing the classification of the second device with i) the device classification listing for the first zone of control and ii) the device classification listing for the second zone of control, determining that both i) the classification of the first device and ii) the classification of the second device matches i) the device classification listing for the first zone of control and ii) the device classification listing for the second zone of control;

in response to determining that both the classification of the first device and the classification of the second device matches i) the device classification listing for the first zone of control and ii) the device classification listing for the second zone of control, polling each device included by the first zone of control and the second zone of control, including:

providing, by a first gateway managing the devices included within the first zone of control, a command to each device included by the first zone of control, and providing, by a second gateway managing the devices included within the second zone of control, a command to each device included by the second zone of control;

in response to polling each device included by the first zone of control and the second zone of control, determining that the first and the second device only respond to the command provided by the first gateway;

in response to determining that the first and the device only responds to the command provided by the first gateway, identifying the first gateway of the first zone of control as managing the first and the second device; and in response to identifying the gateway of the first zone of control as managing the first and the second device, controlling one or more parameters of one or more other devices that are included by the first zone of control through the gateway of the first zone of control.

10. The system of claim 9, the operations further comprising:
in response to identifying the first gateway of the first zone of control as managing the first and the second device, identifying respective classifications of the one or more other devices included by the first zone of control.

11. The system of claim 9, the operations further comprising:
identifying a third device located within the first zone of control;
comparing a classification of the third device with the device classification listing for the first zone of control;
in response to comparing a classification of the third device with the device classification listing for the first zone of control, determining that the device classification listing for the first zone of control does not include the classification of the third device; and
in response to determining that the device classification listing for the first zone of control does not include the classification of the third device, updating a database to indicate the third device as an anomaly for the first zone of control.

12. The system of claim 11, the operations further comprising:
in response to determining that the device classification listing for the first zone of control does not include the classification of the third device, polling each device included by the first zone of control;
in response to polling each device included by the first zone of control, determining that the third device is not included in the first zone of control; and
in response to determining that the third device is not included in the first zone of control, updating the database to indicate the third device as the anomaly for the first zone of control.

13. The system of claim 9, the operations further comprising:
based on comparing the classification of the first device with the device classification listing, determining that the classification of the first device matches only the device classification listing of the first zone of control;
in response to determining that the classification of the first device matches only the device classification listing of the first zone of control, identifying the gateway of the first zone of control as managing the first device; and
in response to identifying the gateway of the first zone of control as managing the first device, controlling one or more parameters of one or more other devices that are included by the first zone of control through the gateway of the first zone of control.

14. The system of claim 9, wherein identifying the classification of the first device is in response to detecting a presence of the first device.

15. The system of claim 14, wherein detecting the presence of the first device includes visually detecting the first device.

16. The system of claim 9, the operations further comprising:
determining a location of an operator;
detecting a presence of the first device that is positioned proximate to the location of the operator; and
in response to detecting the presence of the first device, identifying the classification of the first device.

17. A non-transitory computer-readable medium storing software comprising instructions executable by one or more computers which, upon such execution, cause the one or more computers to perform operations comprising:
identifying, by a device classification system, a classification of a first device of a plurality of devices, each device of the plurality of devices included within a zone of control of a plurality of zones of control, wherein each zone of control of the plurality of zones of control includes a respective gateway that manages the devices included within that zone of control;
obtaining, for each zone of a control, a device classification listing corresponding to the zone of control, the device classification listing, for each zone of control, including a listing of classes of devices included by that zone of control, the device classification listing including multiple classifications of devices corresponding to the zones of control, the device classification listing only including which classification of the devices are controlled by which gateway and is independent of a location of each of the plurality of devices and the gateways for each zone of control;
comparing, by the device classification system, the classification of the first device with the device classification listing for each zone of control;
based on comparing the classification of the first device with the device classification listing for each zone of control, determining, by the device classification system, that the classification of the first device matches i) the device classification listing for a first zone of control and ii) the device classification listing for a second zone of control;
in response to determining that the classification of the first device matches i) the device classification listing for the first zone of control and ii) the device classification listing for the second zone of control, identifying a classification of a second device of the plurality of devices;
comparing, by the device classification system, the classification of the second device with i) the device classification listing for the first zone of control and ii) the device classification listing for the second zone of control;
based on comparing the classification of the second device with i) the device classification listing for the first zone of control and ii) the device classification listing for the second zone of control, determining, by the device classification system, that both i) the classification of the first device and ii) the classification of the second device matches i) the device classification listing for the first zone of control and ii) the device classification listing for the second zone of control;
in response to determining that both the classification of the first device and the classification of the second device matches i) the device classification listing for the first zone of control and ii) the device classification listing for the second zone of control, polling each device included by the first zone of control and the second zone of control, including:
providing, by a first gateway managing the devices included within the first zone of control, a command to each device included by the first zone of control, and
providing, by a second gateway managing the devices included within the second zone of control, a command to each device included by the second zone of control;
in response to polling each device included by the first zone of control and the second zone of control, determining that the first and the second device only respond to the command provided by the first gateway;

in response to determining that the first and the second device only responds to the command provided by the first gateway, identifying the first gateway of the first zone of control as managing the first and the second device; and in response to identifying the gateway of the first zone of control as managing the first and the second device, controlling, by the device classification system, one or more parameters of one or more other devices that are included by the first zone of control through the gateway of the first zone of control.

18. The computer-readable medium of claim 17, the operations further comprising:

in response to identifying the first gateway of the first zone of control as managing the first and the second device, identifying respective classifications of the one or more other devices included by the first zone of control.

* * * * *